May 19, 1964   J. O. HINKLE ETAL   3,133,337
APPARATUS FOR ASSEMBLING COMPONENTS
Filed June 21, 1962   13 Sheets-Sheet 3

INVENTORS
J.O. HINKLE
S.A. MYSLINSKI
F.J. SCHNEIDER
BY
ATTORNEY

May 19, 1964  J. O. HINKLE ETAL  3,133,337
APPARATUS FOR ASSEMBLING COMPONENTS
Filed June 21, 1962  13 Sheets-Sheet 6

INVENTORS
J. O. HINKLE
S. A. MYSLINSKI
F. J. SCHNEIDER
BY
ATTORNEY

May 19, 1964 J. O. HINKLE ETAL 3,133,337
APPARATUS FOR ASSEMBLING COMPONENTS
Filed June 21, 1962 13 Sheets-Sheet 11

INVENTORS
J. O. HINKLE
S. A. MYSLINSKI
F. J. SCHNEIDER
BY
ATTORNEY

United States Patent Office 3,133,337
Patented May 19, 1964

3,133,337
APPARATUS FOR ASSEMBLING COMPONENTS
James O. Hinkle, Emmaus, Stephen A. Myslinski, Reading, and Fred J. Schneider, Allentown, Pa., assignors to Western Electric Company, Incorporated, New York, N.Y., a corporation of New York
Filed June 21, 1962, Ser. No. 204,209
20 Claims. (Cl. 29—25.3)

This invention relates to apparatus for assembling components, particularly diodes having dielectric sleeves with spaced cylindrical conductive ends to respectively receive wire carrying pins and wafer carrying pins in opposing ends thereof.

In the manufacture of components of this type the various parts must be assembled individually and with a high degree of accuracy to assure completion of each assembly into an efficient component. For example, in the manufacture of diodes an N-type germanium wafer is used and is mounted, in each instance, on a conductive pin to be mounted in its particular end or conductive cylinder of the dielectric sleeve. Furthermore, the wire which is to contact the wafer is supported by its conductive pin and must be moved into assembly in various stages with high degree efficiency to bring about the desired result, an efficient component.

An object of the present invention is a continuously operable apparatus for efficiently assembling components.

In accordance with the object the apparatus for assembling components includes means having forces successively utilized to move wire supporting pins and wafer supporting pins into their respective cylindrical conductive ends of dielectric sleeves until the wire and wafer in each instance engage each other, after which, subsequent relative movements are imparted thereto to complete the assembly of each component.

More specifically, during the initial assembly of the component parts the wire and the wafer fail to touch each other but during a subsequent operation the parts are brought together under a slight deflection of the wire, which has an S-shaped bend therein. Subsequent to this operation the parts are submitted to an electrical pulse to convert the area of the N-type germanium wafer adjacent to the wire into a P-type portion. Subsequent to this operation final relative movement of the parts are brought about through the actual squeezing of the pin carrying the wire toward the wafer until the predetermined minimum resistance is registered in the component.

Other objects and advantages will be apparent from the following detailed description when considered in conjunction with the accompanying drawing wherein:

FIG. 9 is an enlarged fragmentary sectional view of the pin feeding means.

Figure 17:
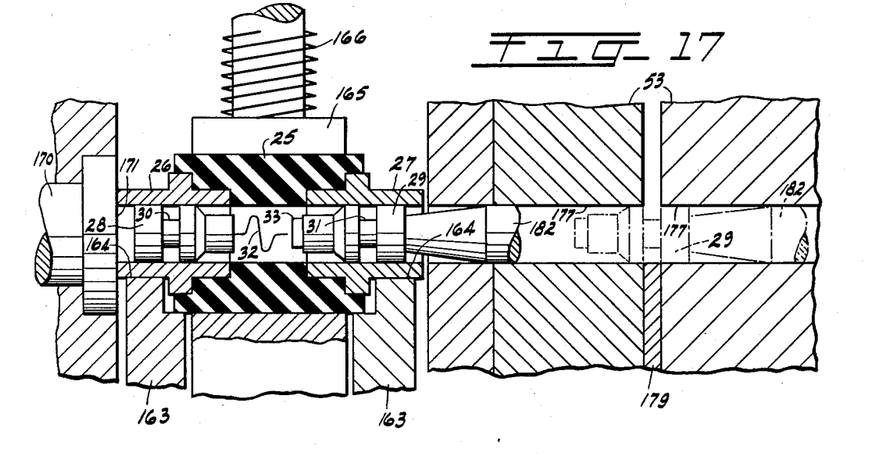
FIG. 17 is an enlarged fragmentary detailed view taken substantially laterally of the tracks illustrating the feeding of the wafer supporting pin into its conductive end of the dielectric sleeve.

In the present instance the component to be assembled, FIG. 17, includes a dielectric sleeve 25 with spaced cylindrical conductive ends 26 and 27 molded therein and adapted to receive pins 28 and 29 respectively. The pins 28 and 29 are identical in that they are circular in cross section and adapted for tight squeeze fit in their respective cylindrical ends 26 and 27 of the sleeve 25. Annular grooves 30 and 31 are formed in the pins for cooperation with guiding means hereinafter described. Each pin 28 has an S-shaped wire 32 mounted thereon while each pin 29 has an N-type germanium wafer 33 mounted thereon.

Apparatus in General

Figure 1:
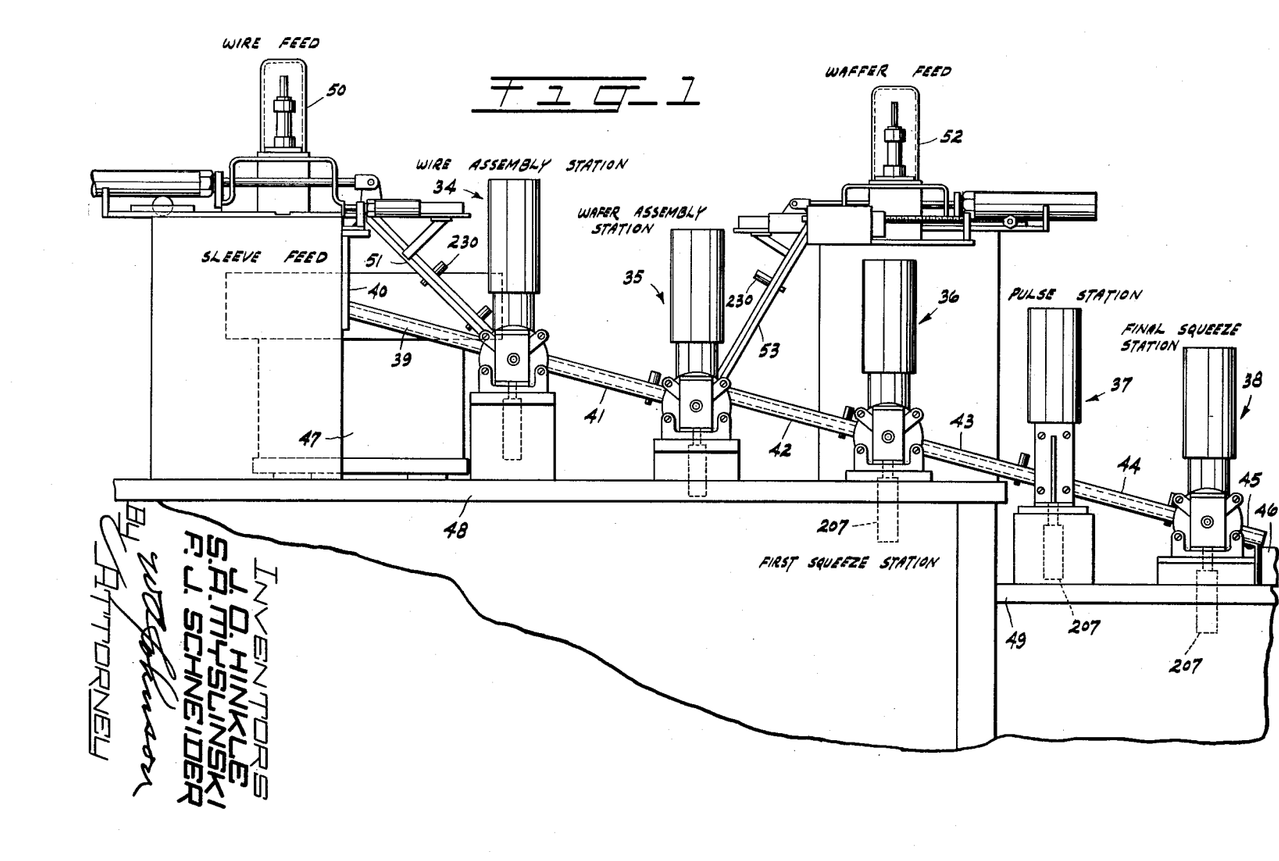
FIG. 1 is a front elevational view of the apparatus.

The apparatus as shown in FIG. 1 includes spaced operating stations 34, 35, 36, 37 and 38 with a main track 39 leading from a sleeve feeding unit 40 to the first operating station 34, other main tracks 41, 42, 43 and 44 connecting the operating stations and final track 45 leading from the operating station 38 to a receptacle 46. The first main track 39, receives the sleeves 25 successively from the feeding unit 40, the sleeves being fed to this unit by a vibrating feeder 47, mounted on a support 48 with the operating stations 34, 35 and 36 another support 49 being provided for the operating stations 37 and 38 and the receptacle 46. A unit 50 is operable to feed the wire supporting pins 28 successively along an auxiliary track 51 to the station 34, which may be known as the wire assembly press station, where the pin supporting pins 28 are moved successively into sleeves 25 presented at this station. A unit 52 substantially identical with the unit 50, with the exception that the unit 50 may be defined as a right hand unit and the unit 52 may be defined as a left hand unit, is positioned to feed the pins 29 supporting the wafers 33 successively down an auxiliary track 53 to the station 35. The station 35 may be identified as the wafer assembly press station in that at this station the successive pins 29 carrying wafers 33 are forced into their respective cylindrical ends 27 of the successive sleeves 25.

The station 36 is identified as the first fine squeeze station in that at this station there is caused relative movement of the pin in each sleeve until the free end of the wire 32 engages the wafer 33 with enough deflection of the wire to assure electrical contact between each wire and its wafer.

At station 37 each component is included in an electrical circuit so that an electrical pulse, such as the sending of 60 volts A.C. through the assembled unit for .8 of a second, will cause heat to be generated to drive a few electrons from the atoms in the region of the point contact, leaving holes and thus converting into P-type a small volume of the N-type germanium wafer immediately under and around the point.

The station 38 is defined as a final fine squeeze station where there is a final setting of the relative positions of the wire with respect to the wafer of each component.

Sleeve Feed

Figures 2, 3:
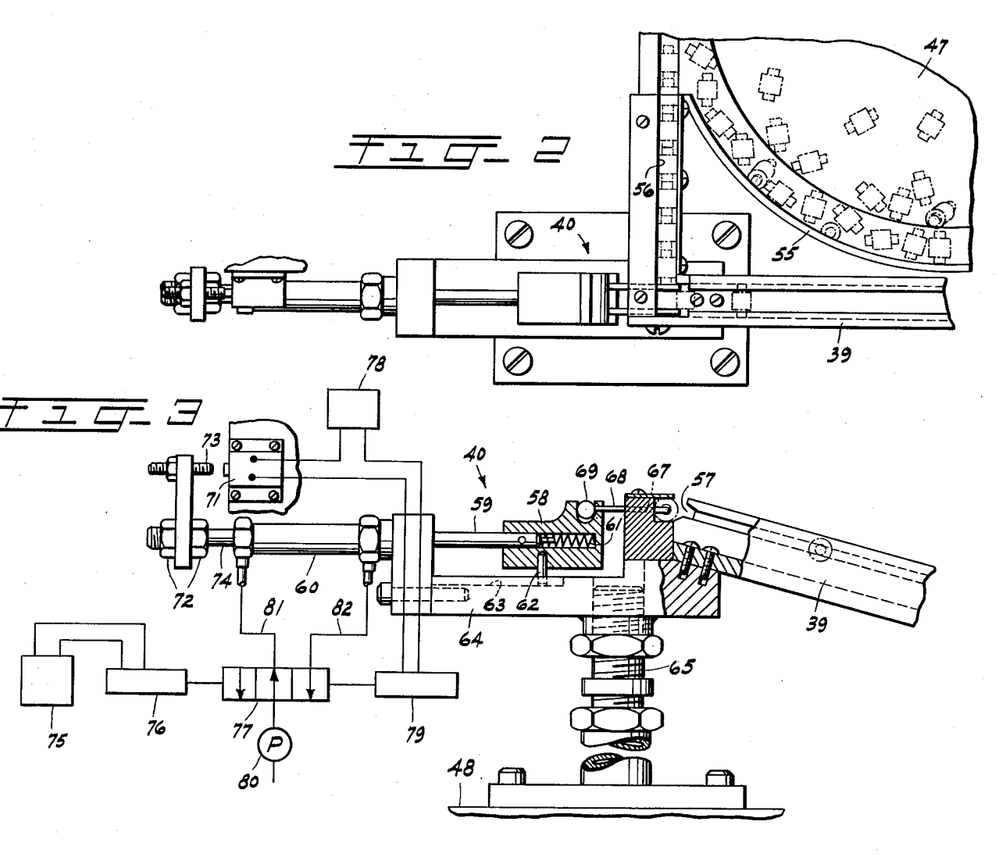
FIG. 2 is a fragmentary top plan view of the sleeve feeding means.
FIG. 3 is a front elevational view of the structure shown in FIG. 2 portions thereof being shown in section.
Figure 3:
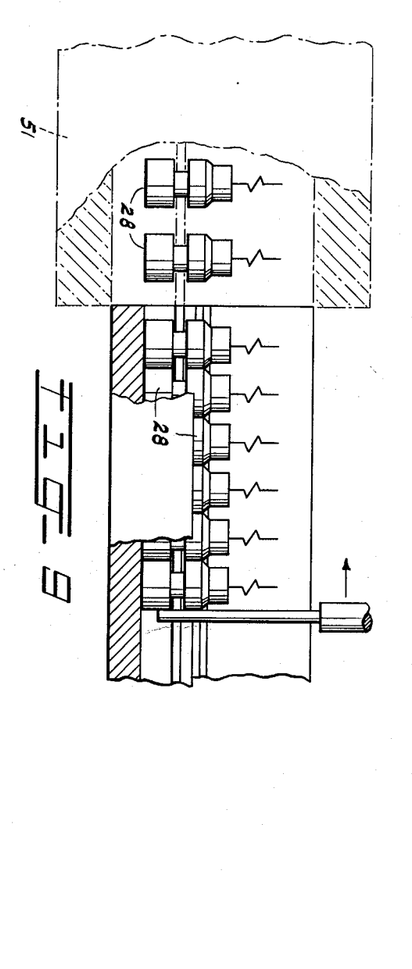
Figure 4:
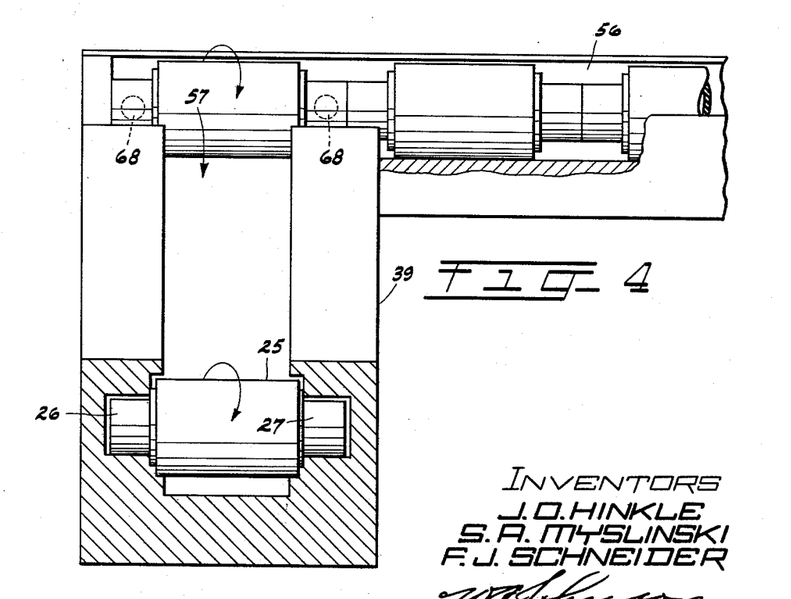
FIG. 4 is an enlarged fragmentary detailed view of a portion of the sleeve feeding means.
Figure 5:
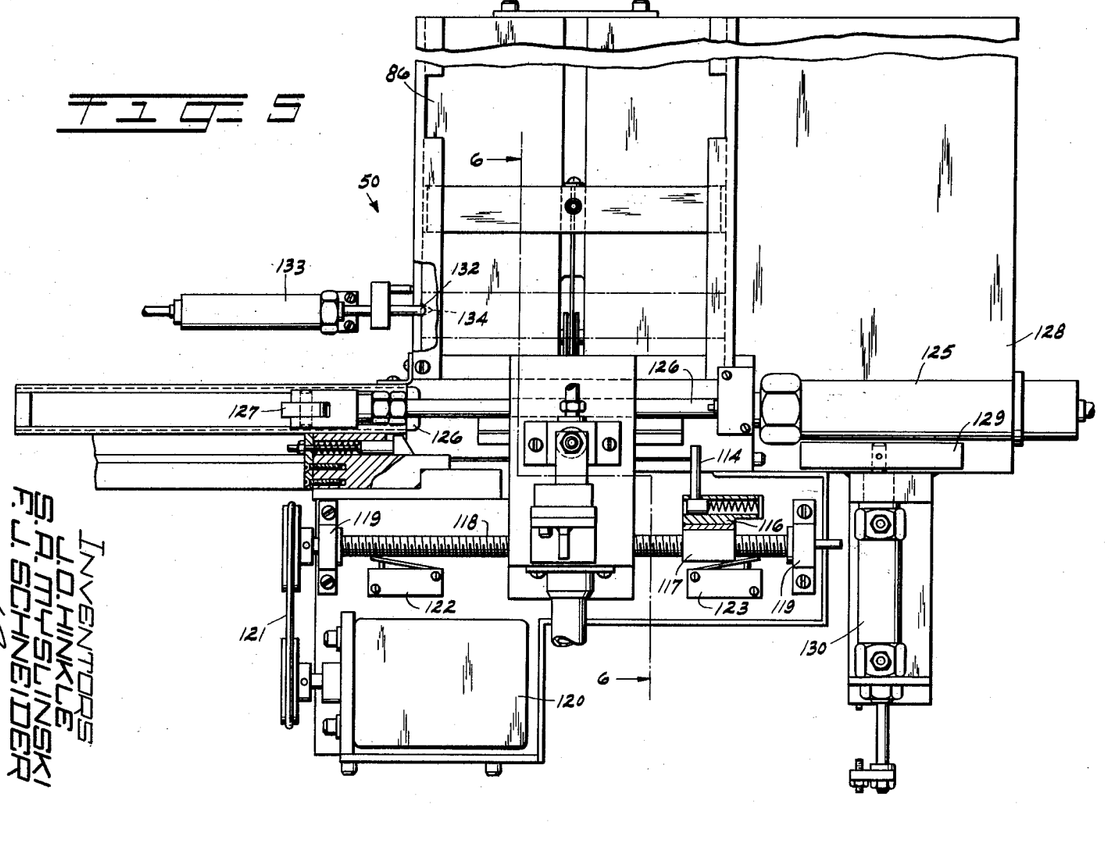
FIG. 5 is a top plan view of the feeding means for the wire or wafer supporting pins.

The sleeve feeding means is shown in more detail in FIGS. 2, 3 and 4. A vibrating feeder 47 with a supply of sleeves 25 therein will cause the sleeves to move toward an outer edge 55 where they will move eventually along a chute 56 and into the unit 40 where they will be located singly adjacent an entrance end 57 of the main track 39. An ejector 58, mounted on a piston rod 59, of an air cylinder 60, is cushioned by a spring 61 and held against rotation by a pin 62 riding in a groove 63 of a bracket 64. The bracket 64 is adjustably mounted at 65 on a base 48 and has spaced apertures 67 for pins 68 supported at 69 by the ejector 58. During each cycle of operation of the air cylinder 60, the ejector 58 through its pins 68 engage the cylindrical ends of a sleeve in the feeding position and forces it into the entrance end 57 of the track 39.

The control for the feeding means or unit 40 is responsive to an initiating relay and switch 71 which are normally open. Switch 71 can be adjusted by member 73 mounted on piston rod 74 of the air cylinder 60. The stroke of air cylinder 60 is adjusted by nuts 72. The circuit for solenoid 76 of valve 77 is provided with a source 75 of electrical energy. The switch 71 is any circuit provided with a source 78 of electrical energy and includes a solenoid 79 of the valve 77. Air under pressure is provided by adjustable means such as a pump 80 and through the action of the valve 77 responsive to the actions of the solenoids 76 and 79 air under pressure may be directed alternately through lines 81 and 82, the lines also serving alternately as exhaust lines through the exhaust portions of the valve.

Wire Feed

Figure 6:
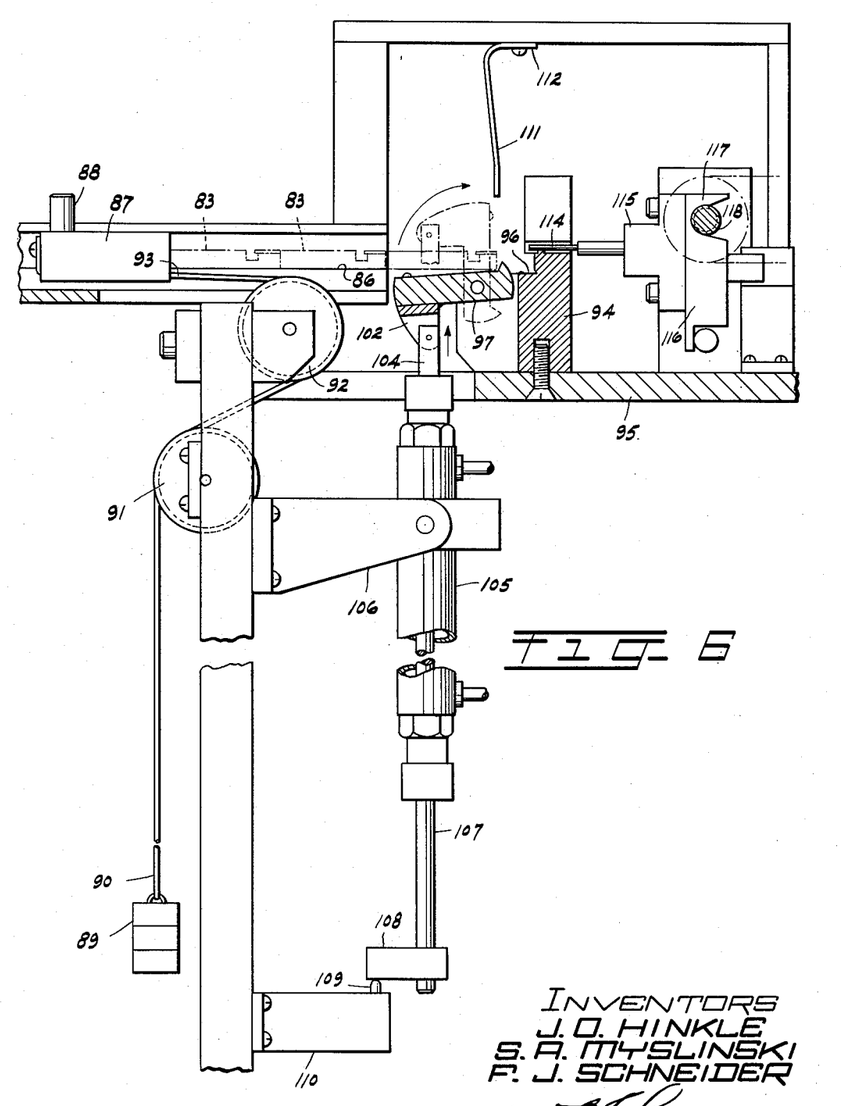
FIG. 6 is an enlarged vertical view taken along the lines 6—6 of FIG. 5.

In FIGS. 5 to 10 inclusive the means is illustrated by feeding the wire supporting pins 28 to the station 34. The pins 28 are pre-located in magazines 83, the magazines being identical and provided with longitudinal grooves 84 for slidably supporting a predetermined number of pins 28 and including rails 85 in the form of metal strips extending parallel with the grooves 84 and positioned to enter the annular grooves 30 of the pins 28 to assure movement of the pins in a definite line to enter the auxiliary track 51. The magazines 83 are placed on a table 86 in front of a push-bar 87 which has a handle 88 used in placing the magazines on the table. The push-bar 87, FIG. 6, is urged to the right by a weight 89 mounted on the lower end of a cable 90, the cable extending around grooved rollers 91 and 92 to a position 93 where its upper end is fixed to the push-bar 87.

Figure 7:
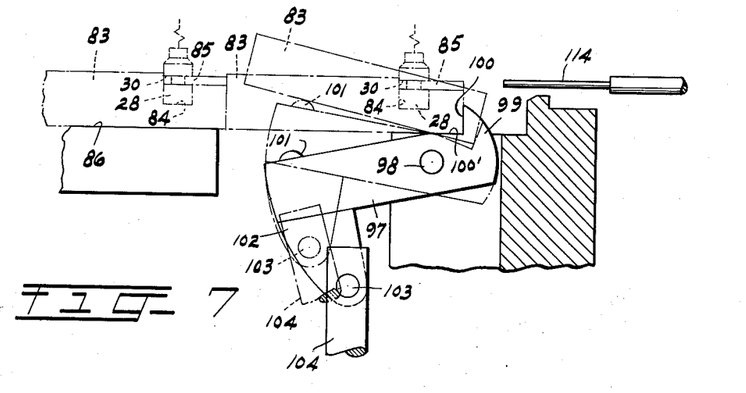
FIG. 7 is a fragmentary detailed view of the magazine unloading means shown in one position.
Figure 8:
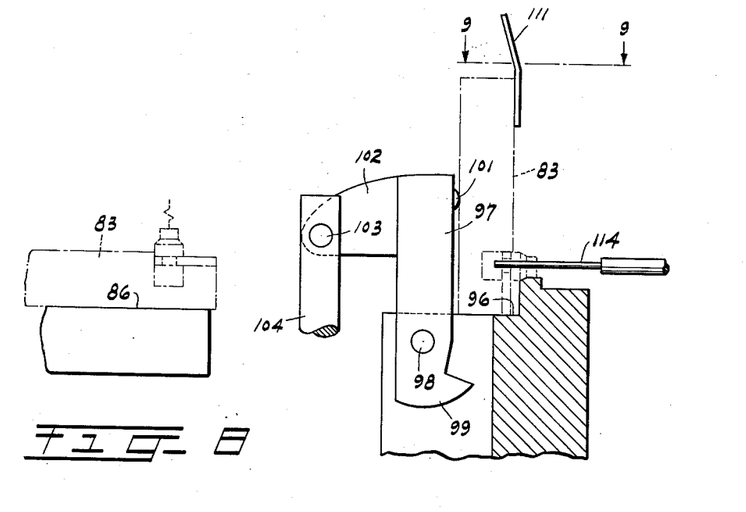
FIG. 8 is a fragmentary sectional view of the structure shown in FIG. 7 in another position.

An elongated member 94 mounted on a support 95 has a platform 96 adapted to support the leading ends of each magazine when deposed in an unloading position shown in FIG. 8. A movable element 97 pivotally mounted at 98 is substantially equal in length to the magazines 83 and is provided with a projection 99 having an angularly positioned stop surface 100 positioned adjacent an undercut portion 100' and located normally parallel with the leading end of each magazine. A bottom-like projection 101 of the element 97 is positioned to engage the bottom of each magazine. Another projection 102 carries a pin 103 for connection with a piston rod 104. The piston rod 104 is of an air cylinder 105 pivotally supported at 106 and provided with another piston rod 107 supporting an arm 108 positioned to operate a plunger 109 of a switch 110 which may be included in a circuit not shown. At the start of the operating cycle of the element 97 the stop surface allows additional forward movement of the leading magazine from the other magazines on the table 86 to give clearance for swinging the leading magazines. During further movement operation of the element 97 from the position shown in FIG. 7, to its unloading position, where the magazine has moved through 90° and caused to rest with its smaller leading end on the platform 96. Here it will remain until all of the wire supporting pins 28 have been removed from the magazine. A flat spring 111, supported at 112, is engaged by each magazine when moved into the unloading position shown in FIG. 8 to help return the magazines to a horizontal position from the platform 96 after the magazines are emptied.

The means for unloading the magazine while on the platform 96 includes a finger 114, which is located normally at one end of the magazine when located on the platform 96, adapted to engage the end pin in the magazine as illustrated in FIG. 8. The unloading means includes a support 115 for the finger 114 mounted on a slide 116 with a half nut 117 positioned in engagement with a threaded shaft 118. The ends of the threaded shaft 118 are supported by bearings 119, the shaft being driven alternately in reverse direction by a reversible motor 120 through a belt and pulley connection 121. Switches 122 and 123 may be included in circuits with the motor 120 to control the reversing action and stopping respectively of the motor in any desired conventional manner. The finger 114, at its starting position shown in FIGS. 5 and 8, will be moved a predetermined distance to move all of the pins 28 from the magazine in the unloading position FIG. 8 simultaneously, but in successive order into the auxiliary track 51. The auxiliary track 51 is provided in FIGS. 9 and 10 with an inwardly projecting rail 124 receivable in the annular grooves 30 of the pins 28 to accurately guide the pins successively toward the station 34.

When all of the pins 28 are removed from the magazine 83 in the unloading position shown in FIG. 8, the motor 120 will be reversed to move the finger 114 back to its starting position and during this interval the air cylinder 105 will be operated to return the element 97 to its receiving position shown in FIG. 7. When the empty magazine has been returned to the receiving position with the element 97, an air cylinder 125 is operated to cause its piston rod 126 FIG. 5 to move a horizontal slide 126, supported at 127 on the piston rod, to engage the left end of the empty magazine and move it onto a table 128. After this has been accomplished the slide 126 returns to the position shown in FIG. 5 this being the second portion of a complete and continuous operating cycle of the air cylinder 125. After the empty magazine has been located on the table 128 a pusher 129 is operated through an operating cycle of an air cylinder 130 to move the empty magazine and any other empty magazines on the table 128, a given distance to allow for the next empty magazine to be received on the table. This operating cycle of the air cylinder 130 may be brought about by any suitable means operated in timed relation with the other operating units of the pin feeding unit 50. These various operations, include movement of the leading magazine onto the platform 96, the unloading of this magazine, the return movement of the empty magazine to the receiving position and the removal of the empty magazine from the element 97 to take place while the next leading magazine 83 on the table 86 is held by a plunger 132 of an air cylinder 133 entering a recess 134 of the magazine to keep the magazine against forward movement until conditions are ready for it to be placed on the element 97. At this time, the air cylinder 133 is operated to allow the next magazine to move onto the element 97 against the vertical stop surface 100, the plunger 132 then holds the next lead magazine and all the others on the table 86 against forward movement.

Wire Assembly

Figure 13:
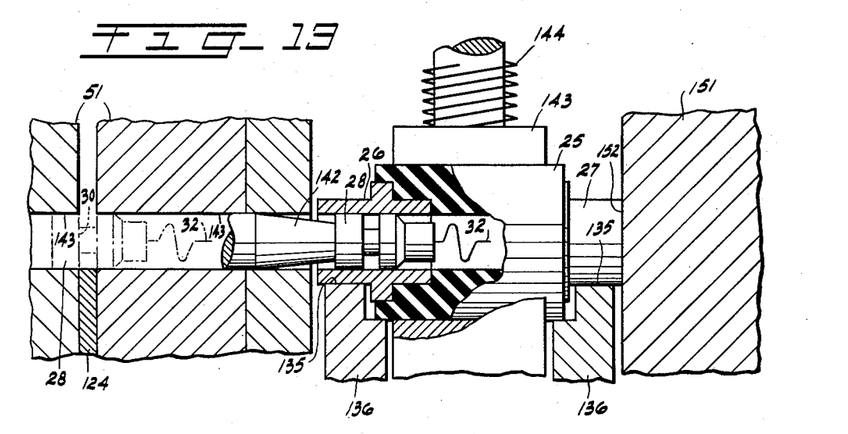
FIG. 13 is an enlarged fragmentary detailed view taken laterally of the tracks at such station.

At station 34, FIGS. 1, 11, 12 and 13 the sleeves 25 are received singly from track 39. When a sleeve reaches the station 34, the cylindrical ends 26 and 27 come to rest in notches 135 of members 136 mounted on a bracket 137, which is supported by the base or main support 48. The surface 138 of a passageway 139 serves as a stop for the successive sleeves to locate them in the notches 135. The track 51 for the wire supporting pins 28 guide the pins to the end of their travel on the track where the pins are aligned with their cylindrical members 26 of the sleeve 25 as illustrated in FIG. 13. At this position, the rail 124 is reduced so as not to extend into the groove 30 to free the pin for movement into the cylindrical member 26.

Figures 11, 12:
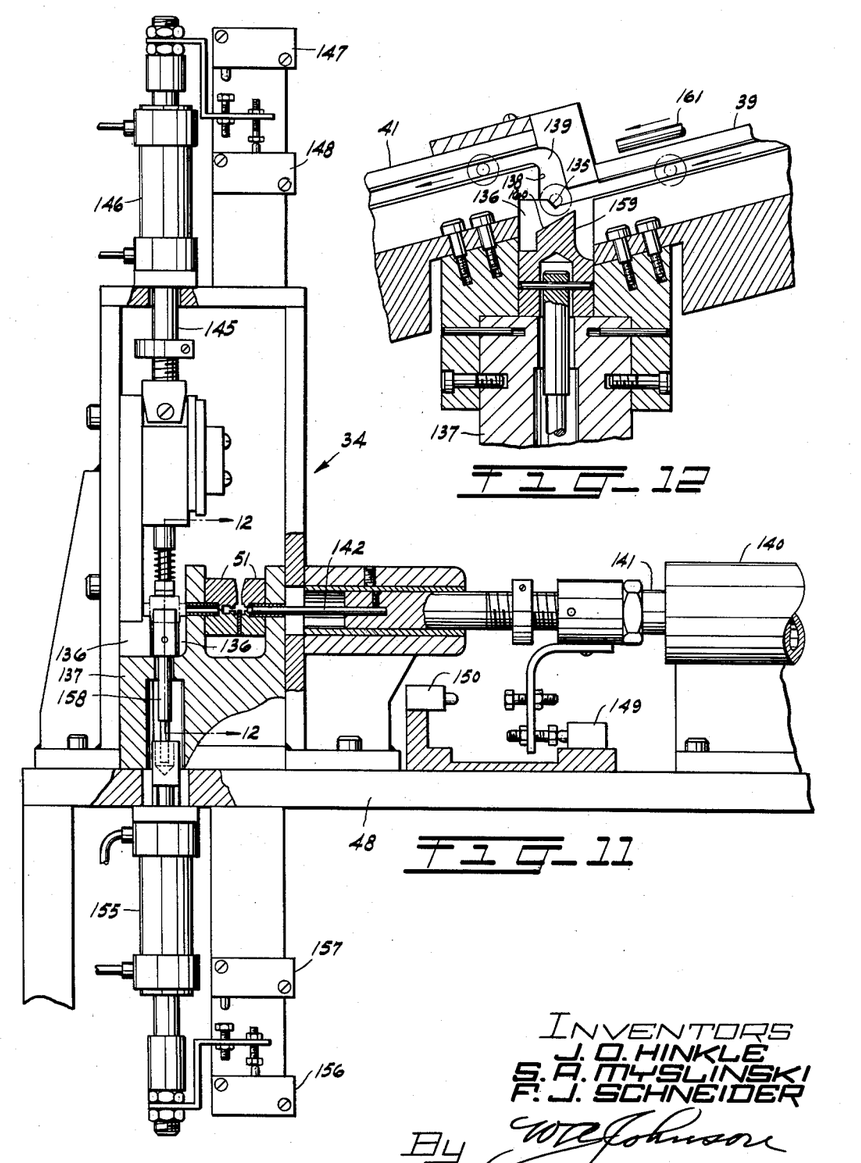
FIG. 11 is a vertical sectional view of the wire assembly press station where a wire supporting pin is mounted in each sleeve.
FIG. 12 is a fragmentary sectional view taken longitudinally of the tracks at that station.

This action is brought about through operation of an air cylinder 140 to move its piston rod 141 to the left FIG. 11 to cause a loading pin 142, mounted in the end of the piston rod, to move through apertures 143 in the track 51 to force the pin 28 from the track 51 and into the sleeve 26. FIGS. 11 and 13 are taken from opposite sides of the center of this action and for this reason the pin 142 is moved to the left in FIG. 11 but moved to the right in FIG. 13. During this action, the sleeve 25 is forced downwardly to center the cylindrical members 26 and 27 in the notches 135 and to hold the sleeve against displacement by a pressure pad 143 backed by a spring 144 which supplies suitable force from a piston rod 145 of an air cylinder 146. The air cylinder 146 is under control of suitable circuits (not shown) including switches 147 and 148 including a timing unit assuring its action at predetermined intervals. The air cylinder 140 is under the control of switches 149 and 150 including a timing unit (not shown) desired to bring about its action in timed relation with the action of the air cylinder 146. A member 151 with a reference surface 152 disposed in alignment with the sleeve 25 in the loading or assembling portions of station 34 serves in positioning the sleeve during assembly of the wire supporting pin therein. After this assembly has been completed an air cylinder 155 is operated under the control of circuits including switches 156 and 157 to move the sleeve and wire supporting pin to track 41. After the air cylinders 140 and 146 have been operated to their normal or starting positions the air cylinder will move a piston rod 158 upwardly to cause an ejecting element 159 with its tapered upper surface 160 to engage the sleeve and move it upwardly into the passageway 39 and cause it to travel in the track 41 toward the wafer assembly station 35. A nozzle 161 supplies a jet of air directed toward the entrance end of the track 41 to assist the travel of the sleeves with their pin supporting studs from the station 34 toward the station 35.

Wafer Feed

The wafer supporting pins 29 are presented to the apparatus in magazines 83 and fed to the auxiliary track 53 by the unit 52. The unit 52 is substantially identical to the unit 50 shown in FIGS. 5 to 9 inclusive, the only difference being that the wafer supporting pins 29 are moved to the left FIG. 1 out of their magazines 83 to the track 53 whereas the wire supporting pins 28 are moved to the right FIG. 1 out of their magazines 83 to the track 51.

Wafer Assembly

At station 35 similar action takes place in that the sleeves 25 with the wire supporting pins therein are received in a similar structure as shown in FIG. 12 including members 163 with notches 164 FIG. 17 in their upper ends to receive and support the cylindrical ends 26 and 27 of the successive sleeves 25. At this station the auxiliary track 53 ends to position successive wafer supporting pins 29 in alignment with the cylindrical end 27. Each sleeve at this station is held in the notches 164 of the members 163 by a pressure pad 165 backed by a spring 166, which is under the influence of a piston rod 167 of an air cylinder 168. The main difference between the structure of station 35 in FIG. 14 and that of station 34 in FIG. 11 is the assistance of a member 170 with the reference surface 171 mounted on a piston rod 172 of an air cylinder 173 and under the control of an adjustable stop 174 positioned to abut against a member 175 when the air cylinder is operated to be engaged by the sleeve 26 to locate the sleeve during forcing of the wafer carrying pin 28 into the end 27.

Figure 14:
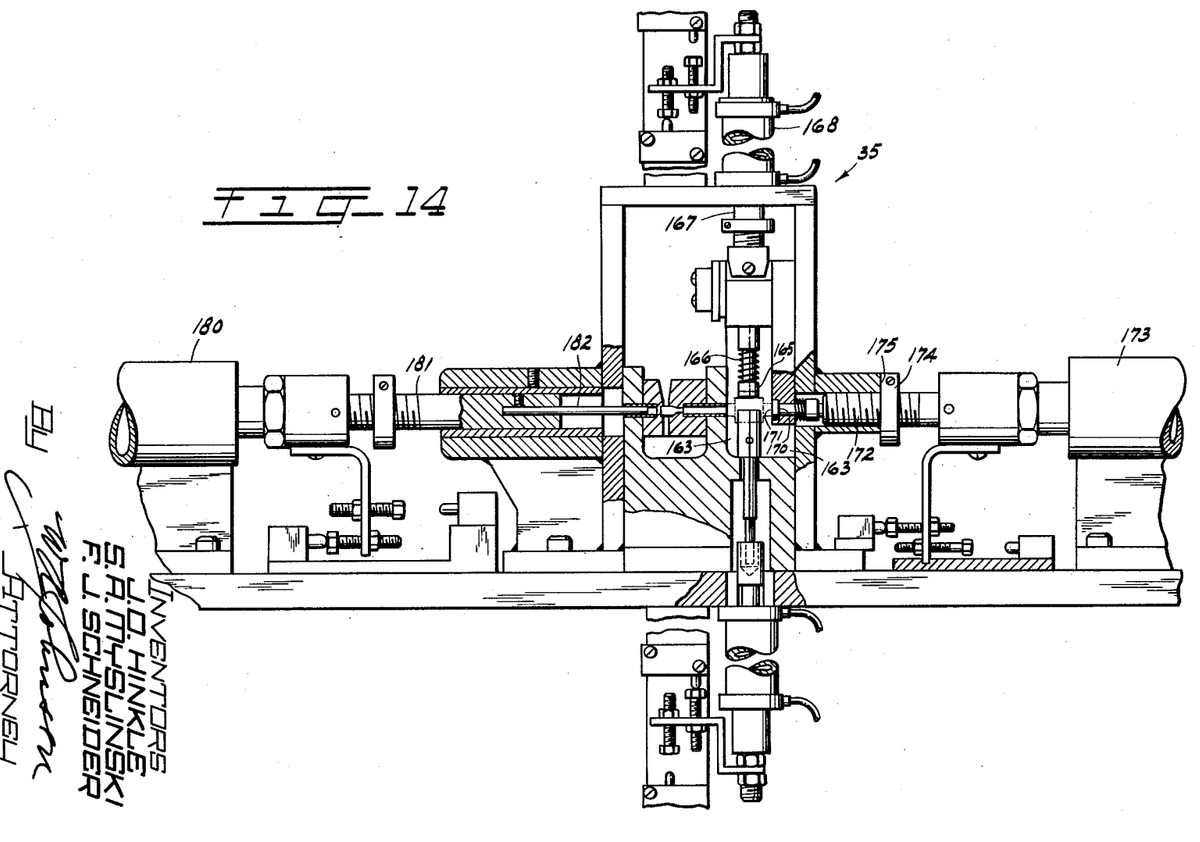
FIG. 14 is a vertical sectional view of the wafer pin assembling station.
Figure 15:
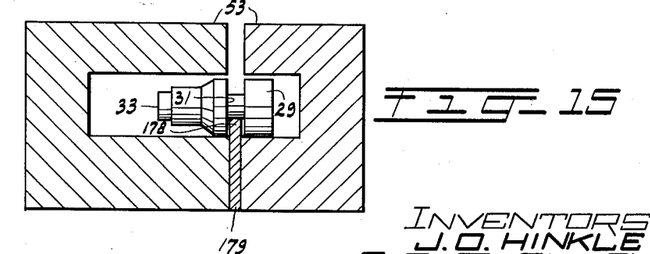
FIG. 15 is an enlarged sectional view of a track leading to such station.
Figure 16:
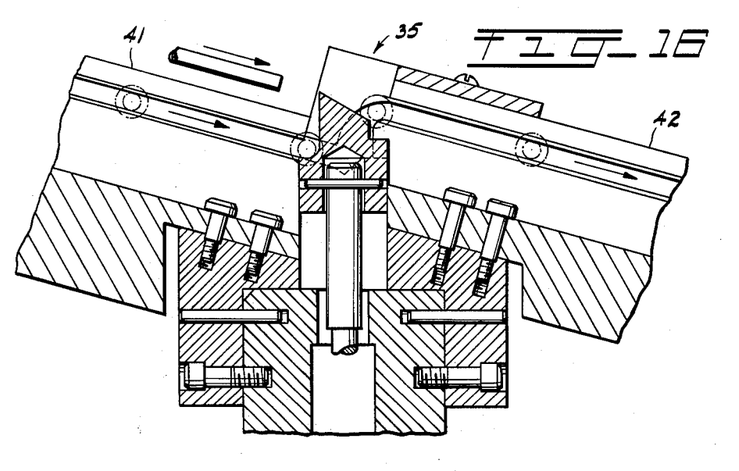
FIG. 16 is a vertical sectional view taken substantially longitudinally of the tracks at the wafer assembling station.

The pin 29, aligned with the cylindrical end 27, when located in apertures 177 of the track 53, is free of the inwardly projecting end 178 of the member which, like the rail 124 for the wire carrying pin, when in the apertures 177, will be moved into the cylindrical end 27 through operation of an air cylinder 180 moving its piston rod 181 to the left of FIG. 14 causing the assembly pin 182 mounted on the end of the piston rod to move through the apertures 177 to force the wafer carrying pin into the cylindrical end 27 as shown in FIG. 17. FIGS. 14 and 17 are views taken from opposite sides of the center line of this action and for this reason the wafer carrying pin is moved in the sleeve from the left FIG. 14 and from the right FIG. 17.

First and Final Squeeze Stations

Figures 10, 20:
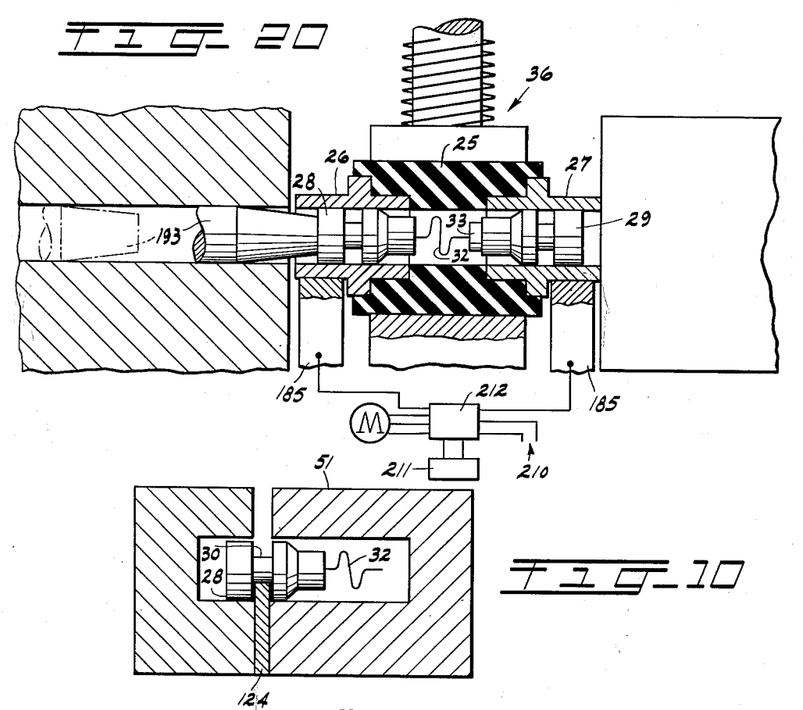
FIG. 10 is an enlarged sectional view of the feeding track for the wire supporting pins.
FIG. 20 is a fragmentary vertical sectional view illustrating the results on each component of the first wire squeeze action.
Figure 19:
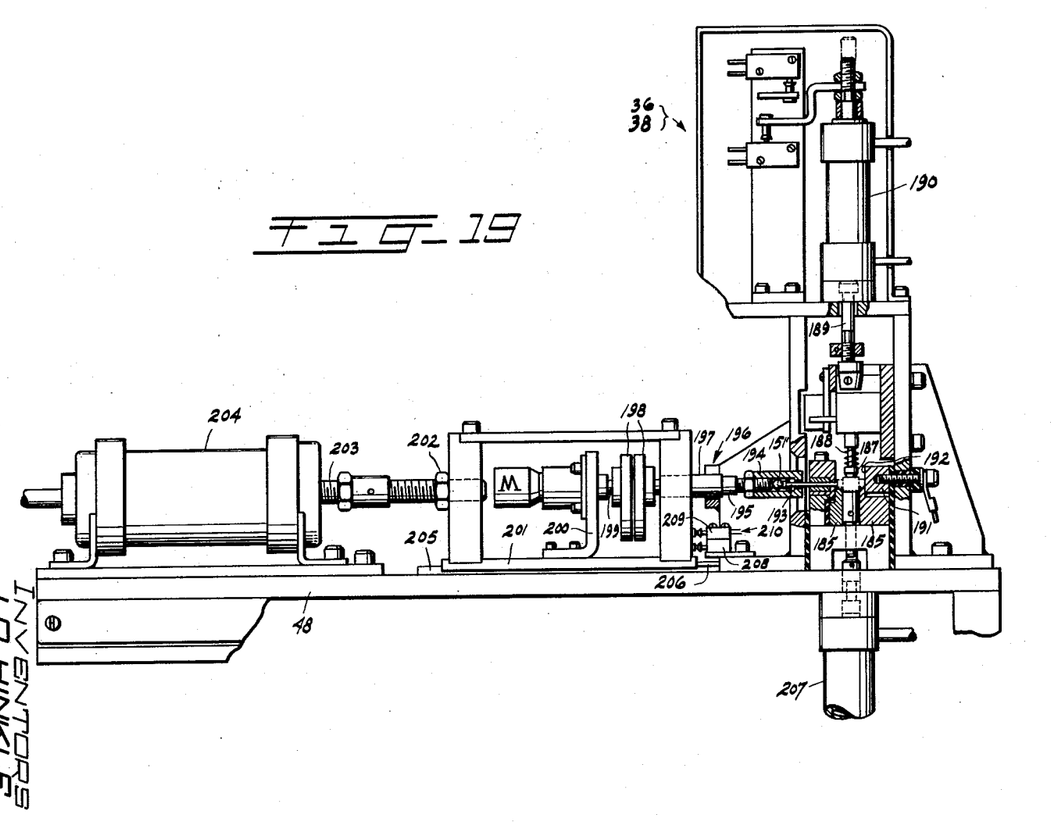
FIG. 19 is a front elevational view of a structure employed both at the first wire squeeze station and at the final wire squeeze station.
Figure 21:
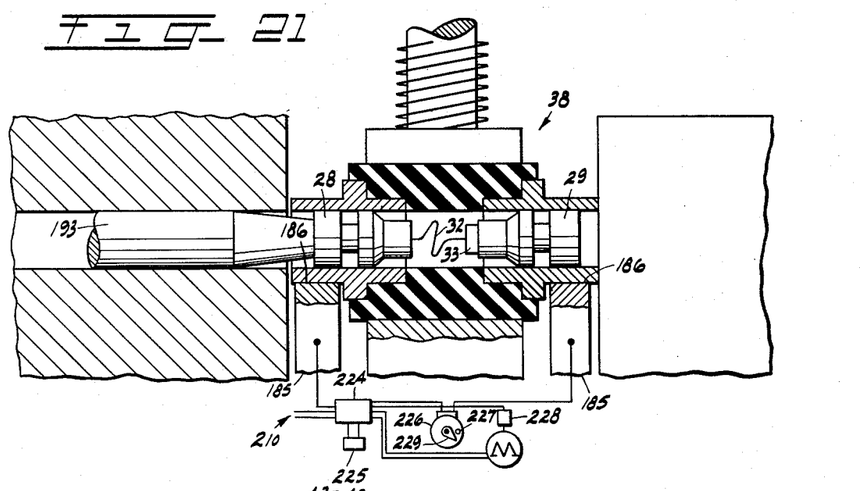
FIG. 21 is a fragmentary sectional view of a portion of the final squeeze station illustrating the action at that station.

The first and final squeeze stations 36 and 38 are identical mechanically but differ only in electrical controls illustrated in FIGS. 20 and 21. Therefore, the disclosure in FIG. 19 will suffice for both units 36 and 38. When the components reach the station 36 they are as illustrated in FIG. 17 with the end of the wire 32 out of contact with the wafer 33. The purpose of the unit 36 is to cause relative movement of the pins 28 and 29, actually, movement of the pin 28 until the free end of the wire not only engages the germanium wafer 33, but until there is a slight deflection in the wire as illustrated in the comparison of FIGS. 17 and 20. This deflection in the wire is necessary because the mere contact of the wire with the wafer may be followed by relaxation of the wire resulting in no contact between the wire and the wafer. In FIG. 19 the unit has notched members or nests 185 to receive the cylindrical conductive ends 26 and 27 of the component in the notches 186 thereof while the component is being held by a pressure pad 187 under the assistance of spring 188 and under the control of a piston rod 189 of an air cylinder 190. A member 191 having a reference surface 192 is positioned to be engaged by the end of the cylindrical member 27. The movement of the wire supporting pin 28 is brought about by a push rod 193, which is insulated from the machine by a sapphire ball 151' and by a dielectric coupling 194 mounted on the end of an inner driven member 195 of a micrometer indicated generally at 196. The inner driven member 195 of the micrometer, is joined by a coupling 198 or other suitable means to a shaft 199 of a motor M supported by a bracket 200 on a carriage 201. The carriage 201 is adjustably connected at 202 to a piston rod 203 of an air cylinder 204, which is mounted on the support 48. The carriage 201 is supported for sliding movement between suitable guides 205 on the support 48 and is limited in its operating movement to the right by a stop 206. The air cylinder 190 and an ejecting air cylinder 207 may be under the control of a suitable means such as one or more timing units triggered by a switch such as that illustrated at 208. Another switch 209 is provided for the structure in each instance that is, for the first squeeze station 36 and also the final squeeze station 38 through lines 210 to trigger their respective electrical controls shown respectively in FIGS. 20 and 21 for the stations 36 and 38. The electrical control for the unit 36 FIG. 20 illustrates a source of electrical energy 211 for a control unit 212 triggered by closing of switch 209 and through lines 210 to energize the reversible motor M to drive micrometer sleeve 197 and through the action of the micrometer cause gradual forward movement of the push rod 193. This continues until there is sufficient electrical contact between elements of the component, that is, between the wire 32 and the wafer 33 at which time, through action of the unit 212 the motor M will be reversed moving the push rod 193 away from the wire supporting pin 28.

Pulse Station

Figure 18:
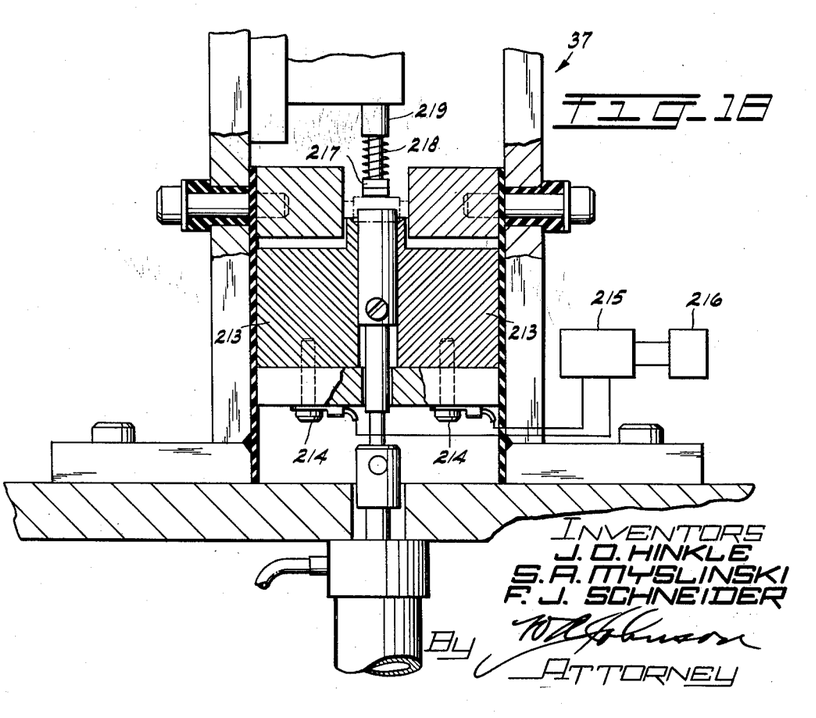
FIG. 18 is a fragmentary sectional view of a portion of the pulse station.

Before completing the description of the final squeeze station 38, attention is directed to the pulse station 37 FIG. 18. At this station each component is held as at the squeeze stations in nests of conductive members 213 by a pressure pad 217 assisted by a spring 218 and under the action of a piston rod 219. At this position, the component is included in a circuit with the conductive members 213, terminals 214 and a control unit 215 supplied with electrical energy from a source 216 to apply a predetermined electrical pulse to the component. In the present instance, the pulsing action includes sending 60 volt A.C. electrical current through the component or the assembled parts thereof for a .8 of a second. The heat generated during this interval drives a few electrons from the atoms in the region of the point contact of the wire with the wafer, leaving holes in the wafer and thus converting into P-type a small volume of the N-type germanium wafer immediately under and around the point of the wire.

Figure 22:
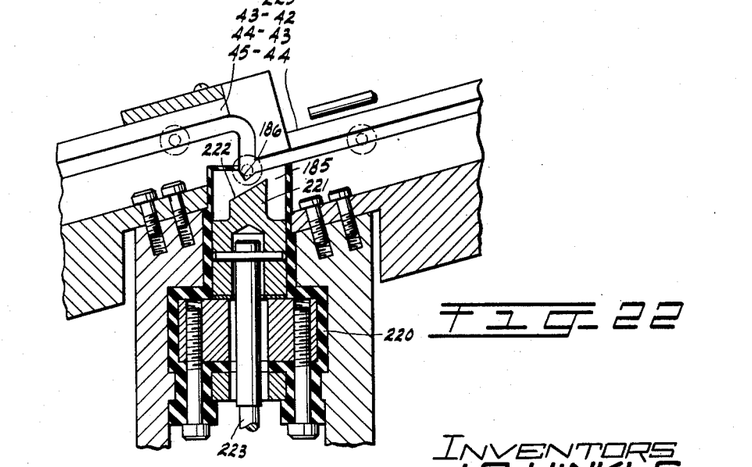
FIG. 22 is a fragmentary sectional view of the supporting and ejecting means at the last three stations.

FIG. 22 represents the component supporting area at the juncture of tracks 42 and 43 of station 36, tracks 43 and 44 of station 37 and tracks 44 and 45 of station 38. This structure, although similar to the structures at stations 34 and 35, differs in this respect that the nests or component supporting members in the last three stations are surrounded substantially by dielectric material 220 to eliminate any possible shorts in the electrical circuits at these stations. Each of the three structures is provided with a transferring member 221 with a tapered surface 222 positioned to engage the component resting in the nests 186 and through the action of the piston rod 223 of air cylinder 207 at the stations 36, 37 and 38, the component at each of these stations will be moved upwardly to travel down the next or outgoing track.

Final Squeeze Station

The purpose of the final squeeze station is to complete the assembly structure of the component by relative movement of the pin 28 until the electrical resistance in the component is reduced to a predetermined minimum. This is accomplished by the mechanical structure shown in FIG. 19 and an electrical control shown schematically in FIG. 21. As soon as the component reaches the station 38 the air cylinder 190, through suitable controls not shown is operated to clamp the component in place and to actuate the air cylinder 204 to move the carriage 201 to the extent of its previously adjusted movement (at stop 206) at which time the push rod 193 is disposed in engagement with the pin 28. At this time, the switch 209 is closed to activate a control unit 224, FIG. 21, which is supplied with electrical energy from a source 225. In this instance, an ammeter 226 is included in a circuit with the parts of the component, namely, the wire 32 and the wafer 33, this existing after the portion of the germanium wafer adjacent the wire has been converted from N-type to P-type. The function of the control unit 224 through the assistance of ammeter 226, including a photocell 227 and its responsive element 228, is to allow the motor M to drive the push-rod 193 forwardly through the micrometer members 195 and 197 until the resistance in the component has reached a predetermined minimum where the needle 229 of the ammeter activates the photocell 227 resulting in reversing the motor M to drive the push rod 193 away from the pin 28.

Operation

Once the apparatus has been in operation its action is automatic requiring only the addition of sleeves to the vibrating feeder 47 and magazines to the wire feed 50 and the wafer feed 52. The feeding means for the sleeves as shown in FIGS. 2, 3 and 4 may be timed with the maximum time required for any one of the operations so that the track 39 will be substantially filled with sleeves received initially from the vibrating units 47, moved end to end through the trough 56 and forced into the entrance 57 of the track 59 through the operating means shown in FIG. 3. In a similar manner, the units 50 and 52, shown in detail in FIGS. 5 to 9 inclusive, may be operated through predetermined intervals to feed their respective wire supporting pins and wafer supporting pins to the auxiliary tracks 51 and 53 leading to the stations 34 and 35 respectively. However, due to the fact that numerous wire supporting pins are moved onto the track 51 by the unit 50 from loaded magazines 83 and in a similar manner wafer supporting pins are moved onto the track 53 from loaded magazines by the unit 52, suitable means, such as photocells 230 may be mounted in the tracks 51 and 53 respectively, to control actions of the motors 120 for the units 50 and 52 to cause stopping of the motors for intervals of time to avoid overloading or jamming of pins in attempting to feed them into the tracks 51 and 53.

The apparatus is, therefore, composed of five operating stations with feeding means 40, 50 and 52, for the various parts directing the main part, namely, the sleeve 25 at predetermined intervals to the station 34 where a wire supporting pin 28 arrives in alignment therewith. At the same time and through the action shown in FIG. 11, the wire supporting pin is forced into its respective end of the sleeve. Following this action, the sleeve with its wire supporting pin is transferred by the means shown in FIGS. 11 and 12 to track 41 where it travels to the station 35. At station 35, the sleeve is aligned with a wafer supporting pin the latter being forced into the sleeve through the action of the unit shown in FIG. 14. The sleeves and the pins are presented in succession at the stations so that the assembly may be as rapid as possible, the units at these stations being accurate with the assistance of reference surfaces, in their operation to leave space between the wire in each component and its wafer so that at station 36 through relative movement of the pins of each component, that is through actual fine controlled movement of wire pin supportiong pin at station 36 through action of the unit shown in FIGS. 19 and 20, the wire supporting pin is moved a control distance so that the free end of the wire will engage the wafer under a known pressure to incorporate a predetermined deflection in the wire as illustrated by comparing FIG. 17 with FIG. 20. This contact between the wire and the wafer in each instance, as the components are received singly in the pulse station 37, conditions them to receive their electrical pulse to convert the portion of the N-type germanium wafer adjacent the pin into P-type structure thus conditioning the components for the final action which is created at the station 38. At this station, the final squeezing action is brought about by the structure shown in FIGS. 19 and 21 to create a final deflection in the bent wire until the resistance in the component is reduced to a predetermined minimum during the driving of the motor M to force the pin 28 toward the pin 29 until the ammeter 226 records the predetermined minimum resistance through the action of the needle 229 to activate the photocell 227 thus causing reversal of the motor M to move the push rod 193 to the left away from the pin 28. This completes the assembly of each component after which the component through the structure shown in FIG. 22 will be caused to be moved down track 45 to the receptacle 46, FIG. 1.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for assembling components each component to have a dielectric sleeve with spaced cylindrical conductive ends to respectively receive a bent wire supporting pin and a wafer supporting pin comprising:

spaced operating stations, means disposed at one of the stations to receive and hold the sleeves successively, means disposed at said station to receive the wire supporting pins successively, means disposed at said station to force the successive wire supporting pins into their respective conductive ends of the successive sleeves, means disposed at another of the stations to receive and hold successively the sleeves with the wire supporting pins in like ends thereof, means to direct the sleeves with the wire supporting pins to said other station, means disposed at said other station to receive the wafer supporting pins successively, and means disposed at said other station to force the successive wafer supporting pins into their respective ends of the sleeves.

2. An apparatus for assembling components according to claim 1 in which:

means is disposed at another of the stations to clamp the sleeves of the successive components against movement, and means disposed at said last named station to cause relative movement of the pins of the components until the respective wires and wafers thereof contact each other.

3. An apparatus for assembling components according to claim 1 in which:

means is disposed at another of the stations to clamp the sleeves of the successive components against movement, means disposed at said last named station to cause relative movement of the wire supporting pins and wafer supporting pins of the components until the respective wires and wafers thereof contact each other, the wafer of each wafer supporting pin being an N-type germanium wafer, and means disposed at a subsequent station to cause an electrical current to flow through the successive components to heat the areas of the wafers of the wafer supporting pins engaged by wires of the wire supporting pins to convert the areas of the wafers adjacent the wires into P-type portions.

4. An apparatus for assembling components according to claim 1 in which:

means is disposed at another of the stations to clamp the sleeves of the successive components against movement, means disposed at said last named station to cause relative movement of the wire supporting pins and the wafer supporting pins of the components until the respective wires and wafers thereof contact each other, the wafer of each wafer supporting pin being an N-type germanium wafer, means disposed at a subsequent station to cause an electrical current to flow through the successive components to heat the areas of the wafers engaged by the wires of the wire supporting pins to convert the areas of the wafers adjacent the wires into P-type portions, means disposed at a final station to hold the successive components, and means disposed at the final station to impart final relative movement of the pins in the successive components to flex the wires of the wire supporting pins and to operate in conjunction with electrical means to stop the moving means when a predetermined electrical resistance exists between each wire and its wafer of the wafer supporting pin.

5. An apparatus for assembling components each component to have a dielectric sleeve with spaced cylindrical conductive ends to respectively receive a bent wire supporting pin and an N-type germanium wafer supporting pin comprising:

means to force the successive wire supporting pins and wafer supporting pins into their respective ends of the sleeves until there is engagement between the respective wires of the wire supporting pins and wafers of the wafer supporting pins under light forces, and means to cause an electrical current to flow through the successive components to heat the areas of the wafers engaged by the wires to convert the areas of the wafers adjacent the wires into P-type portions.

6. An apparatus for assembling components according to claim 5 in which:

electrical means is operable to indicate the electrical resistance in each component in the area of the wire and wafer, and means to cause further relative movement of the wire carrying pin and wafer carrying pin in each component toward each other to deflect the bent wire to increase the force of its contact with the wafer until a predetermined resistance at its contact with the wafer is indicated.

7. An apparatus for assembling components each component to have a dielectric sleeve with spaced cylindrical conductive ends to respectively receive a bent wire supporting pin and a germanium wafer supporting pin comprising:

spaced operating stations, main track sections for guiding the sleeves successively relative to the operating stations, means to feed the sleeves successively to the first main track section leading to the first operating station, auxiliary tracks for guiding the pins successively to certain of the operating stations, and means operable to said certain stations to force the successive wire supporting and wafer supporting pins into their respective ends of the successive sleeves.

8. An apparatus for assembling components according to claim 7 in which:

magazines are loaded with rows of like pins, and means operable to move the pins successively from the magazines onto the auxiliary tracks.

9. An apparatus for assembling components according to claim 7 in which:

magazines are loaded with rows of like pins, a magazine unloading station disposed adjacent an entrance end of each auxiliary track, means operable to move the magazines successively into alignment with the entrance ends of the auxiliary track, and means operable to move the pins successively off the magazines and onto the auxiliary tracks.

10. An apparatus for assembling components according to claim 7 in which:

a platform is mounted at a fixed position in substantial alignment with an entrance end of each auxiliary tracks, magazines loaded with rows of like pins, a movable magazine supporting element, and means operable to move the element to position the magazines singly onto the platform and hold the magazine thereon until the pins are removed therefrom.

11. An apparatus for assembling components according to claim 7 in which:
a platform is mounted at a fixed position in substantial alignment with an entrance end of each auxiliary track,
magazines loaded with rows of like pins,
a movable magazine supporting element,
means operable to move the element to position the magazines singly onto the platform and hold the magazine thereon until the pins are removed therefrom,
means operable to move the pins successively from the magazine on the shelf onto the auxiliary track, and
means operable to move each emptied magazine free of the element.

12. An apparatus for assembling components according to claim 7 in which:
a platform is mounted at a fixed position in substantial alignment with an entrance end of each auxiliary track,
magazines loaded with rows of like pins,
a movable magazine supporting element,
means operable to move the element to position the magazines singly onto the platform and hold the magazine thereon until the pins are removed therefrom,
means operable to move the pins successively from the magazine on the platform onto the auxiliary track,
means operable when the magazine on the platform is empty to move the empty magazine off the platform, and
means operable to move the empty magazine off the element.

13. An apparatus for assembling components according to claim 7 in which the sleeve feeding means includes:
a chute extending to an entrance end of the main track sections,
means to force the sleeves to move successively in the chute to a loading position at the entrance end of the main track, and
a unit operable to move the sleeves successively from the loading position in the chute onto the track.

14. An apparatus for assembling components according to claim 7 in which:
grooved members provide nests at the operating stations to receive the sleeves from incoming tracks to the stations.

15. An apparatus for assembling components according to claim 7 in which:
grooved members provide nests at the operating stations to receive the sleeves from incoming tracks to the stations, and
pressure pads at each station operable by a unit to hold the successive sleeves in the nest.

16. An apparatus for assembling components according to claim 7 in which:
grooved members provide nests at the operating stations to receive the sleeves from incoming tracks to the stations, and
a transfer unit at each station operable to move the sleeves out of the nests and onto the adjacent outgoing track section.

17. An apparatus for assembling components according to claim 7 in which:
grooved conductive members provide nests at certain of the operating stations to receive the conductive ends of the sleeves from incoming tracks to the stations,
reversible electric motor power means at one station operable in one direction to cause relative movement of the pins in each component toward each other until the wire and wafer thereof engage each other, and,
an electrical control activated by a circuit closed by the engagement of the wire and wafer of each component to reverse the operation of the motor power means.

18. An apparatus for assembling components according to claim 7 in which:
grooved conductive members provide nests at certain of the operating stations to receive the conductive ends of the sleeves from incoming tracks to the stations,
reversible electric motor power means at one station operable in one direction to cause relative movement of the pins in each component toward each other until the wire and wafer thereof engage each other,
an electrical control activated by a circuit closed by the engagement of the wire and wafer of each component to reverse the operation of the motor power means, and
a control unit at another station operable to subject each component to an electrical pulse to convert a portion of the wafer, which is an N-type germanium wafer, adjacent the wire to a P-type portion.

19. An apparatus for assembling components according to claim 7 in which:
grooved conductive members provide nests at certain of the operating stations to receive the conductive ends of the sleeves from incoming tracks to the stations,
reversible electric motor power means at one station operable in a forward direction to cause relative movement of the pins in each component toward each other until electrical resistance in each component reduces to a predetermined minimum, and
electrical control means including an ammeter in a circuit with each component operated when the ammeter indicates the predetermined resistance to reverse the direction of the motor power means.

20. An apparatus for assembling components according to claim 5 in which the forcing means includes:
a push bar for engaging one pin,
a member with a reference surface to be engaged by the opposing end of the sleeve to locate the sleeve at a given position,
a micrometer having a drive sleeve and an inner member, the inner member secured to the push bar, and
a reversible drive motor adapted to drive the sleeve to cause the push bar to cause relative movement of the pins in each component.

References Cited in the file of this patent
UNITED STATES PATENTS
3,069,531     Hill ______________ Dec. 18, 1962